J. CANAN.
Assgnor one-half interest to J. BURROWS, W. & A. CHATFIELD.
HYDRAULIC-LIFTS.
No. 7,348. Reissued Oct. 10, 1876.
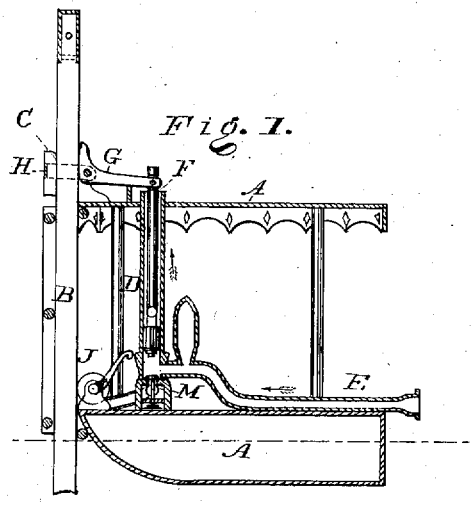
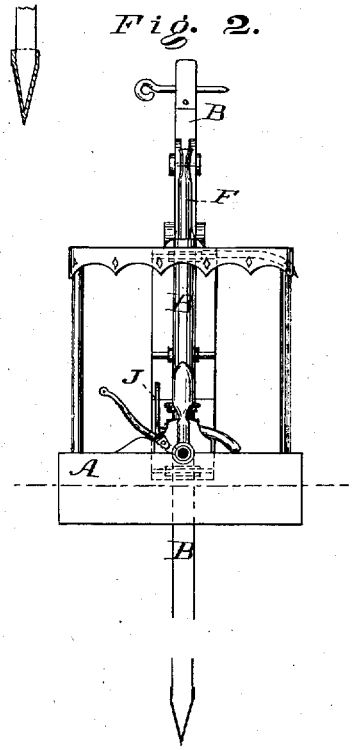
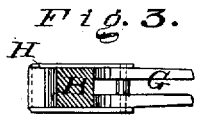
WITNESSES:
Solon C. Kemon
Chas. A. Pettit
INVENTOR:
James Canan
BY
Munn & Co
ATTORNEYS.

UNITED STATES PATENT OFFICE

JAMES CANAN, OF PORT COLBORNE, ONTARIO, CANADA, ASSIGNOR OF ONE-HALF INTEREST TO JOHN BURROW, WALTER CHATFIELD, AND ALBERT CHATFIELD.

IMPROVEMENT IN HYDRAULIC LIFTS.

Specification forming part of Letters Patent No. 177,372, dated May 16, 1876; reissue No. 7,348, dated October 10, 1876; application filed September 27, 1876.

*To all whom it may concern:*

Be it known that I, JAMES CANAN, of Port Colborne, in the county of Welland, Ontario, Canada, have invented a new and useful Improvement in Hydraulic Lifting Apparatus; and I do hereby declare that the following is a full, clear, and exact description of the same.

My invention relates to an improved mechanism for raising spuds or anchors of spoon and other dredges by hydraulic power.

In practice, it is common to provide dredges with three or more such spuds or anchors, for the purpose of holding them stationary while the spoon or other form of the elevator is being operated.

The spuds or anchors are arranged to work in vertical guides, and usually arranged one at the stern and one at each side of the dredge. A cylinder containing a plunger is placed contiguous to each spud or anchor, the several cylinders being connected with a pump, so constructed that the water may be forced into all the cylinders simultaneously or into but one of them, as required. The plunger of each cylinder is connected to its adjacent spud by means of a clamp, which is so constructed as to gripe or bite the spud when upward pressure is applied, thus carrying the spud with it, and to slide downward freely on said spud by its own gravity as soon as the pressure is removed. The pressure is, of course, applied by the plunger as it moves upward, the same being suitably connected with the clamp for that purpose. The clamp is thus made to reciprocate correspondingly with the plunger until the spud has been raised to the requisite height.

In the accompanying drawing, forming part of this specification, Figure 1 is a dredge, exhibiting my improved mechanism as arranged for raising a stern spud or anchor. Fig. 2 is an end view. Fig. 3 is a detail view, showing, with more particularity, the application of the clamp to a spud or anchor.

A is the frame of the dredge; B, a spud or anchor; C, the clamp; D, the cylinder; E, the pipe, to which the pipes (not shown) leading to the pump are to be connected. These pipes should be provided with suitable stop-cocks, so that the water can be admitted into all of the cylinders at the same time or not, as may be desired. F is a plunger-rod, which fits into the cylinder D, as shown. The plunger requires to be connected with the clamp by suitable means. In this instance I show an arm, G, for that purpose. The clamp consists of a strap, H, loosely encircling the spud or anchor, so that it will slide freely downward thereon. It is caused to gripe or bite the spud by the outward movement of the plunger, which in turn applies upward pressure thereto. The clamp is rendered most effective, and caused to bite more readily, by providing the arm G with an upwardly-projecting toe, as shown. The spud is held elevated by an eccentric, J, operated by a lever; but its upward movement is not impeded by it.

The operation is as follows: Having constructed and placed in position the cylinder D with the attachments, as described, I attach hydraulic piping to the pipe E, connecting the said piping to a conveniently-located pump, by which water is forced through the piping referred to into the cylinder, thereby forcing out the plunger-rod F, and, owing to the connection between each rod and its respective anchor, a corresponding motion is conveyed to the latter.

As it would not be desirable to make the cylinder sufficiently long to enable the anchors to be withdrawn in one stroke of the plungers, each cylinder is provided with a draw-off valve, M, through which, when the supply from the pump is stopped, the water in the cylinder is withdrawn, and the plunger-rod, by its own weight, descends to the bottom of the cylinder, and the strap or clamp H also descends simultaneously, so that the operation can be repeated.

The descent of the anchor is arrested by the action of the eccentric rollers J, as before described. Consequently the plunger-rods return alone, and when the pressure is put on again the connection with the clamp and the anchor is once more effected, and the anchors carried still further up, and so on till the anchors have been raised to the height desired.

Instead of water, compressed air, steam, or other similar power might be utilized for the purpose of raising the plunger.

What I claim as my invention is—

1. The combination of the cylinder connected with a force-pump, and provided with a plunger, F, a clamp, H, and spud or anchor, substantially as shown and described, whereby the clamp is caused to gripe the spud as the plunger is forced out and to slide down on the same when the plunger recedes, as specified.

2. The combination, with the spud or anchor, of the cylinder and plunger, the same being suitably connected and arranged to operate substantially as herein shown and described.

JAMES CANAN.

Witnesses:
GEORGE MCEDWARD,
ALBERT G. BROWN.